United States Patent
Abe

(10) Patent No.: US 6,661,924 B1
(45) Date of Patent: Dec. 9, 2003

(54) METHOD AND APPARATUS FOR COMPRESSING AND EXPANDING IMAGE DATA

(75) Inventor: Nobuaki Abe, Hokkaido (JP)

(73) Assignee: Pentax Corporation, Tokyo (JP)

( * ) Notice: Subject to any disclaimer, the term of this patent is extended or adjusted under 35 U.S.C. 154(b) by 618 days.

(21) Appl. No.: 09/657,103

(22) Filed: Sep. 7, 2000

(30) Foreign Application Priority Data

Sep. 10, 1999 (JP) ............................................. 11-257095

(51) Int. Cl.[7] ............................. G06K 9/36; G06K 9/46

(52) U.S. Cl. ........................ 382/232; 382/239; 382/233; 382/246; 382/250

(58) Field of Search ................................ 382/184, 251, 382/233, 232, 287, 250, 295, 248, 296, 239, 297, 245, 299, 246, 298, 300; 345/648, 659, 660, 671, 672, 677; 348/449, 561, 581, 583, 704; 358/428, 451, 488, 525; 708/203, 208, 290; 250/557; 375/240.01, 240.02, 240.03, 240.06, 240.2, 240.23, 240.24, 240.25

(56) References Cited

U.S. PATENT DOCUMENTS

| | | | | |
|---|---|---|---|---|
| 4,952,923 A | * | 8/1990 | Tamura | ........................ 345/671 |
| 5,159,648 A | * | 10/1992 | Ogura et al. | ................. 382/298 |
| 5,572,605 A | * | 11/1996 | Toraichi | ...................... 382/241 |
| 5,737,456 A | * | 4/1998 | Carrington et al. | .......... 382/299 |
| 6,047,089 A | | 4/2000 | Abe | ............................ 382/250 |
| 6,049,634 A | | 4/2000 | Abe | .................... 382/250 |
| 6,104,841 A | * | 8/2000 | Tojo et al. | .................... 382/299 |
| 6,285,398 B1 | * | 9/2001 | Shinsky et al. | .......... 348/223.1 |
| 6,473,558 B1 | * | 10/2002 | Wu et al. | ...................... 386/68 |

FOREIGN PATENT DOCUMENTS

WO 99/64987 12/1999

OTHER PUBLICATIONS

Suri–Kagaku No. 363, pp. 8–12, with English Language Translation.
Toyota Report No. 48, pp. 39–45, with English Language Translation.
IEEE Pac Rim '93, pp. 493–496.
IEICE Trans. Fundamentals. vol. E77–A No. 5, May 1994.
Int. J. Systems Sci., 1995, vol. 26, No. 4, pp. 871–881.
English language translation of WO 99/64987.

* cited by examiner

Primary Examiner—Andrew W. Johns
Assistant Examiner—Amir Alavi
(74) Attorney, Agent, or Firm—Greenblum & Bernstein, P.L.C.

(57) ABSTRACT

An image compression apparatus transforms original image data partitioned into first blocks, each of which is composed of a plurality of pixels, to reduced-image data composed of a smaller number of pixels than that of the original image data. Further, the apparatus generates expanded-image data from the reduced-image data by fluency transform. Based on the expanded-image data and the original image data, differential value data is obtained, and the differential value is transformed to differential DCT coefficient data by DCT processing. Based on the differential DCT coefficient data, a code-length corresponding to a bit-length necessary for a Huffman coding is calculated. The fluency transform has a plurality of modes, each mode being selected in order, the code-length being calculated for all of the modes. Then, a mode which makes the code-length minimum is determined as the optimum mode. The differential DCT coefficient data is Huffman encoded, so that Huffman-encoded bit data is generated. Then, in an image expansion apparatus, the original image data is restored on using the optimum mode, reduced-image data and the Huffman-encoded bit data.

17 Claims, 14 Drawing Sheets

FIG. 6

DIFFERENTIAL DCT COEFFICIENTS $C = $

| $C_{10}$ | | | | | | | |
|---|---|---|---|---|---|---|---|
| −2 | −20 | −14 | 0 | 3 | −1 | 4 | −1 |
| −18 | 0 | −2 | 0 | 0 | 6 | 2 | 0 |
| 9 | 45 | 27 | 3 | 2 | −2 | −6 | 0 |
| 3 | 9 | −11 | −10 | −4 | 1 | 1 | −1 |
| −11 | −25 | 4 | 7 | −1 | 2 | 2 | 0 |
| −10 | 1 | 7 | 2 | 5 | 1 | 0 | 1 |
| 3 | 0 | −3 | 4 | −4 | −4 | −3 | 0 |
| 4 | 0 | −2 | −4 | 2 | −1 | −1 | −1 |

ZIGUZAG SCANNING
⇓
(−2, −20, −18, 9, 0, ······)
⇓

| D. DCT. C. | −2 | −20 | −18 | 9 | 0 | −14 | 0 | −2 | ··· |
|---|---|---|---|---|---|---|---|---|---|
| ZERO RUN LENGTH Z+ CATEGORY NUMBER H | 02 | 05 | 05 | 04 | 14 | | | 12 | ··· |
| CODE-WORD | 01 | 11010 | 11010 | 1011 | 111110110 | | | 11011 | ··· |
| ADDITIONAL BITS | 01 | 01011 | 01101 | 1001 | 0001 | | | 01 | ··· |

ENCODED BIT DATA
{ 0101, 1101001011, 1101001101, 10111001,
1111101100001, 1101101, ···

| PIXEL VALUES \ m | 1 | 2 | 3 |
|---|---|---|---|
| I0 | $R_{ts}$ | $(9R_{ts}+7R_{ts-1})/16$ | $(681R_{ts}+469R_{ts-1}-77R_{ts+1}-49R_{ts-2})/1024$ |
| I1 | $R_{ts}$ | $(11R_{ts}+5R_{ts-1})/16$ | $(849R_{ts}+285R_{ts-1}-85R_{ts+1}-25R_{ts-2})/1024$ |
| I2 | $R_{ts}$ | $(13R_{ts}+3R_{ts-1})/16$ | $(961R_{ts}+141R_{ts-1}-69R_{ts+1}-9R_{ts-2})/1024$ |
| I3 | $R_{ts}$ | $(15R_{ts}+R_{ts-1})/16$ | $(1017R_{ts}+37R_{ts-1}-29R_{ts+1}-R_{ts-2})/1024$ |
| I4 | $R_{ts}$ | $(15R_{ts}+R_{ts+1})/16$ | $(1017R_{ts}-29R_{ts-1}+37R_{ts+1}-R_{ts+2})/1024$ |
| I5 | $R_{ts}$ | $(13R_{ts}+3R_{ts+1})/16$ | $(961R_{ts}-69R_{ts-1}+141R_{ts+1}-9R_{ts+2})/1024$ |
| I6 | $R_{ts}$ | $(11R_{ts}+5R_{ts+1})/16$ | $(849R_{ts}-85R_{ts-1}+285R_{ts+1}-25R_{ts+2})/1024$ |
| I7 | $R_{ts}$ | $(9R_{ts}+7R_{ts+1})/16$ | $(681R_{ts}-77R_{ts-1}+469R_{ts+1}-49R_{ts+2})/1024$ |

| m / I'$_{x7}$ | 1 | 2 | 3 |
|---|---|---|---|
| I'$_{07}$ | I7 | (9I7+7g7)/16 | (681I7+469g7−77h7−49f7)/1024 |
| I'$_{17}$ | I7 | (11I7+5g7)/16 | (849I7+285g7−85h7−25f7)/1024 |
| I'$_{27}$ | I7 | (13I7+3g7)/16 | (961I7+141g7−69h7−9f7)/1024 |
| I'$_{37}$ | I7 | (15I7+g7)/16 | (1017I7+37g7−29h7−f7)/1024 |
| I'$_{47}$ | I7 | (15I7+h7)/16 | (1017I7−29g7+37h7−k7)/1024 |
| I'$_{57}$ | I7 | (13I7+3h7)/16 | (961I7−69g7+141h7−9k7)/1024 |
| I'$_{67}$ | I7 | (11I7+5h7)/16 | (849I7−85g7+285h7−25k7)/1024 |
| I'$_{77}$ | I7 | (9I7+7h7)/16 | (681I7−77g7+469h7−49k7)/1024 |

T2

METHOD AND APPARATUS FOR COMPRESSING AND EXPANDING IMAGE DATA

BACKGROUND OF THE INVENTION

1. Field of the Invention

This invention relates to a method and apparatus for compressing and expanding digital image data, and especially relates to image compression by reducing the number of pixels of original image data, and image expansion by increasing the number of pixels of reduced-image data.

2. Description of the Related Art

In an example of an image compression method, it has been known to calculate the average value of a predetermined number of pixels. In this compression method, applied to original digital image data, which is partitioned into pixel-blocks composed of a plurality of pixels, an average pixel value for the plurality of pixels is calculated in each block. Consequently, reduced-image data composed of pixels having the average pixel values is obtained. When expanding the reduced-image data to restore the original image, an interpolation processing, such as a linear interpolation, is usually performed so that expanded-image data corresponding to the original image data is obtained.

However, since part of the information included in the original image data is lost in the process of generating the reduced-image data, pixel values generated by the interpolation processing are not necessarily equal to corresponding pixel values in the original image data. Namely, the expanded-image data does not coincide with the original image-data. Therefore, picture quality decreases in the process of the compression and expansion processing, and the original image data can not be completely restored.

SUMMARY OF THE INVENTION

Therefore, an object of the present invention is to provide a method and apparatus for compressing and expanding digital image data efficiently, while limiting degradation in picture quality.

The compression apparatus according to the present invention has a reduced-image generating processor, a fluency transform processor, a differential value calculating processor, an orthogonal transform processor, a mode setting processor, a code-length calculating processor, an optimum mode determining processor and an optimum Entropy coding processor. The reduced-image generating processor transforms original imaged at a partitioned into first blocks, each of which is composed of a plurality of pixels, to reduced-image data composed of a smaller number of pixels than that of the original image data. The fluency transform processor applies a fluency transform to the reduced-image data so as to generate expanded-image data partitioned into second blocks corresponding to the first blocks. Note that, the fluency transform has a plurality of modes. The differential value calculating processor obtains differential value data indicating a difference between the original image data and the expanded-image data. The orthogonal transform processor obtains orthogonal transform coefficient data by applying an orthogonal transform to the differential value data. The mode setting processor selects one mode from the plurality of modes. Thus, the orthogonal transform coefficient data is generated in accordance with the selected mode. The code-length calculating processor calculates a code-length corresponding to a bit length of an Entropy-encoded bit data obtained by Entropy coding of the orthogonal transform coefficient data. The code-length calculating processor calculates the code-length in each of the plurality of modes. The optimum mode determining processor determines an optimum mode, by which the code-length becomes minimum, from the plurality of modes. The optimum Entropy coding processor obtains Entropy-encoded bit data by applying the Entropy coding to the orthogonal transform coefficient data in accordance with the optimum mode.

Preferably, the compression apparatus has a recording medium for recording the reduced-image data, the optimum mode and the Entropy-encoded bit data.

On the other hand, an expansion apparatus according to the present invention has a data reading processor, an optimum mode setting processor, an expanded-image generating processor, an Entropy decoding processor, an inverse orthogonal transform processor and an original image data restoring processor. The data reading processor reads the reduced-image data, the Entropy-encoded bit data and the optimum mode recorded in the recording medium. The optimum mode setting processor sets the optimum mode from the plurality of modes.

The expanded-image generating processor applies the fluency transform according to the optimum mode to the reduced-image data so that the expanded-image data is obtained. The Entropy decoding processor that restores the orthogonal transform coefficient data by applying Entropy-decoding to the Entropy-encoded bit data. The inverse orthogonal transform processor restores the differential value data by applying an inverse orthogonal transform to the orthogonal transform coefficient data. The original image data restoring processor restores the original image data on the basis of the expanded-image data and the differential value data.

BRIEF DESCRIPTION OF THE DRAWINGS

The present invention will be better understood from the description of the preferred embodiments of the invention set forth below together with the accompanying drawings, in which:

FIG. 6 is a view showing an example of Huffman coding.

FIG. 11 is a view showing a table T1 indicating 8 pixel values along the horizontal direction in a block.

FIG. 13 is a view showing a table T2 representing 8 pixel values along the vertical direction in the block.

DESCRIPTION OF THE PREFERRED EMBODIMENTS

Hereinafter, the preferred embodiments of the present invention are described with reference to the attached drawings.

Figure 1:
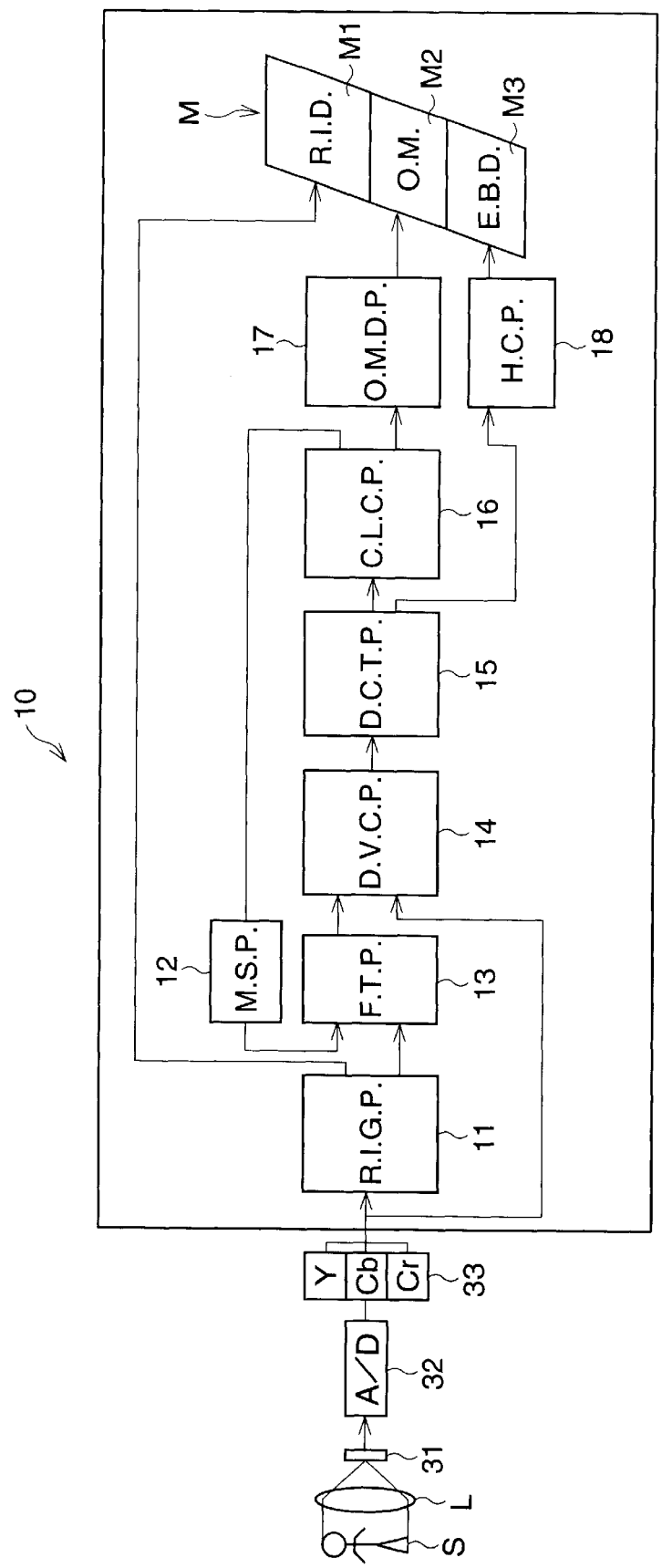
FIG. 1 is a block diagram of an image compression apparatus of an embodiment.
Figure 2:
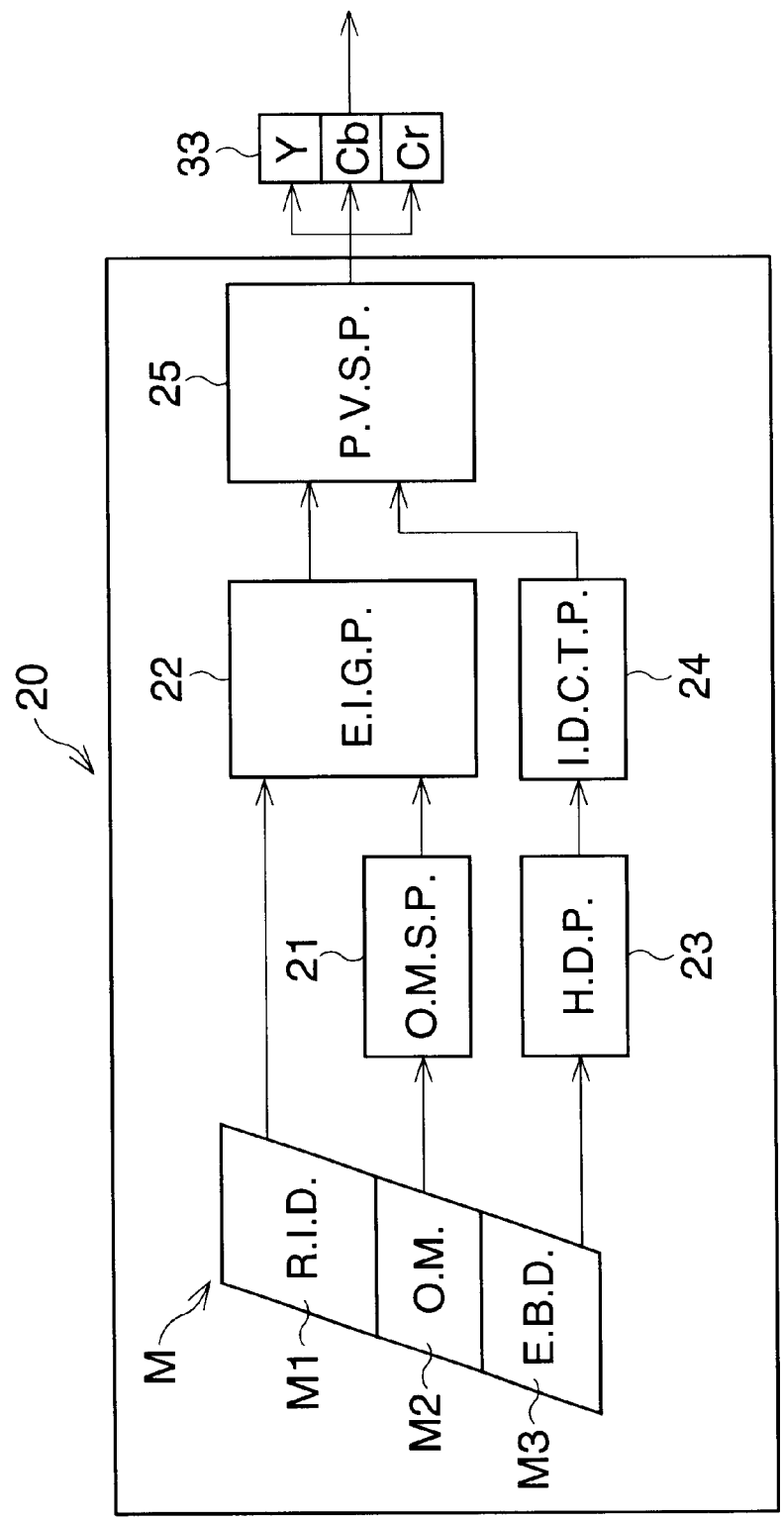
FIG. 2 is a block diagram of an image expansion apparatus of an embodiment.

FIGS. 1 and 2 are block diagrams of an image compression and expansion apparatus according to an embodiment of the present invention. Note that, the image compression and expansion apparatus of the embodiment are incorporated in a digital still camera, and a CPU (not shown) in the camera controls the image compression and expansion apparatus.

Light, reflected on a subject S to be photographed, passes through a photographing optical system L, whereby the subject image is formed on a light-receiving area of a CCD 31. On the light-receiving area, red (R), green (G), blue (B) color filters are provided, thus analog image-pixel signals corresponding to the object image are generated in the CCD 31. The analog image-pixel signals are converted to the digital image signals in a A/D converter 32, and then are subjected to an image processing in an image processing circuit (not shown), so that luminance data Y and color difference data Cb,Cr are generated. The luminance data Y and color difference data Cb,Cr are temporally stored in a memory 33. The memory 33 is divided into independent memory areas for storing the luminance data Y and color difference data Cb,Cr separately. Each memory area has a storage capacity of one frame worth of the subject image.

The luminance data Y and color difference data Cb,Cr stored in the memory 33 are fed to an image compression apparatus 10. The image compression apparatus 10 has a reduced-image generating processor 11, a mode setting processor 12, a fluency transform processor 13, a differential value calculating processor 14, a DCT (Discrete Cosine Transform) processor 15, a code-length calculating processor 16, an optimum mode determining processor 17, a Huffman coding processor 18 and a recording medium M. The luminance data Y and color difference data Cb,Cr are subject to compression processing in the image compression apparatus 10, separately.

The original image data is partitioned into a plurality of pixel-blocks, and each pixel-block of the luminance data Y and color difference data Cb,Cr are separately subjected to a reducing processing in the reduced-image generating processor 11. Thus, reduced-image data, composed of a smaller number of pixels than that of the original image data, is generated. The reduced-image data is stored in a recording area M1 of the recording medium M. Herein, the recording medium M is an IC memory card.

In this embodiment, as described later, a fluency transform having a plurality of modes is executed as an expansion processing in the image expansion apparatus 20. However, expanded-image data obtained by the expansion processing is not identical with the original image data. Therefore, in the image compression apparatus 10, the fluency transform is executed, differential value data indicating a difference between the expanded-image data obtained by the fluency transform and the original image data is obtained, and the difference value data is encoded. For encoding, a JPEG (Joint Photographic Experts Group), which is a standardized compression method of still image data, is applied.

In the mode setting processor 12, one mode is selected from the plurality of modes, and then the reduced-image data is subjected to the fluency transform with the selected mode, by the fluency transform processor 13. Thus, expanded-image data corresponding to the original image data is obtained. The number of pixels of the expanded-image data coincides with that of the original image data. In the differential value calculating processor 14, the differential value data is calculated.

In the DCT processor 15, the differential value data is subjected to DCT processing, so that the differential value data is transformed to differential DCT coefficient data. The DCT is an orthogonal transform, therefore the differential value data is transformed into orthogonal transform coefficient data. In a code-length calculating processor 16, a code-length for Huffman-coding is calculated. Namely, a bit length of Huffman-encoded bit data, obtained by the Huffman coding of the differential DCT coefficient data, is calculated as described later.

After the code-length for the selected mode is calculated, the next mode is selected from the other modes by the mode setting processor 12. Then, the reduced-image data is subjected to the fluency transform using the newly selected mode in the fluency transform processor 13. The code-length is calculated in the code-length calculating processor 16. Hence, the code-length is calculated with regard to all of the modes in order.

In the optimum mode determining processor 17, the optimum mode is determined from all of the modes. When the reduced-image data is subjected to the fluency transform depending upon the optimum mode, the code-length becomes a minimum. The optimum mode is recorded in a recording area M2 of the recording medium M.

After the fluency transform with the optimum mode is applied to the reduced-image data and the generated expanded-image data by fluency transform is transformed to the differential DCT coefficient data, via the differential value calculating processor 14 and the DCT processor 15, the differential DCT coefficient data is subjected to Huffman coding in the Huffman coding processor 18. Consequently, Huffman-encoded bit data in accordance with the optimum mode is generated. The encoded bit data is recorded in a recording area M3 of the recording medium M. Note that, the Huffman coding is Entropy coding.

As shown in FIG. 2, the image expansion apparatus 20 includes a optimum mode setting processor 21, an expanded-image generating processor 22, a Huffman decoding processor 23, an inverse DCT processor 24 and a pixel value synthesizing processor 25. The reduced-image data, the optimum mode and the encoded bit data, obtained in the image compression apparatus 10, are recorded in the recording medium M separately.

When the optimum mode is read from the recording area M2, the mode of the fluency transform for expanding the reduced-image data is set to the optimum mode in the optimum mode setting processor 21. Then, the reduced-image data read from the recording area M1 is subjected to the fluency transform in the expanded-image generating processor 22, thus the expanded-image data corresponding to the original image data is generated.

In the Huffman decoding processor 23, the encoded bit data read from the recording area M3 is subjected to a Huffman decoding so that the differential DCT coefficient data is restored. The Huffman decoding is an Entropy decoding, and is an inverse of the Huffman coding. In the IDCT processor 24, the differential DCT coefficient data is subjected to the IDCT processing, so that the differential value data is restored. The IDCT processing is an inverse orthogonal transform, and is an inverse of the DCT processing.

In the pixel value synthesizing processor 25, the differential value data obtained by the IDCT processor 24 is subtracted from the expanded-image data obtained by the expanded-image generating processor 22. Consequently, the original image data is restored. The original image data is temporally stored in the memory 33, and fed to a display (not shown), such as a LCD (Liquid Crystal Display). Consequently, the photographed image is shown on the display. Note that, the compression and expansion processing in the embodiment is substantially a lossless coding and decoding, whereby no part of the original image data is lost.

Figure 3:
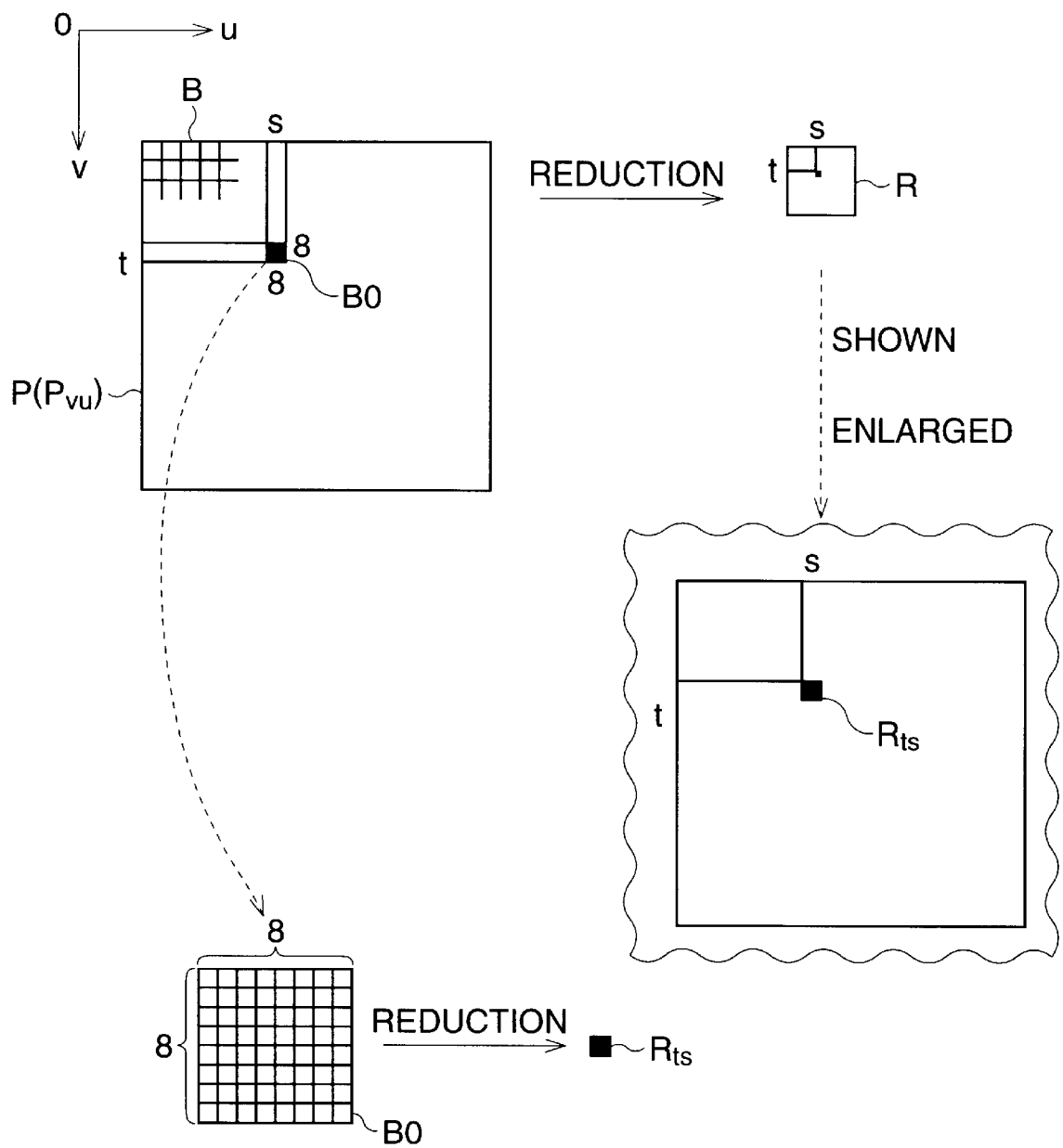
FIG. 3 is a view showing an image reduction of original image data.

FIG. 3 is a view showing an image reduction processing to the original image data.

The original image data, represented by "P", has 1024× 512 pixels, and is partitioned into a plurality of blocks B, each of which is composed of 8×8(=64) pixels $P_{vu}$. The plurality of blocks is arranged in a matrix. A range of value of each pixel $P_{vu}$ is 0 to 255, and pixel values are also represented by "$P_{vu}$". As shown in FIG. 3, u-v coordinates are defined with respect to the original image data P. The left corner of the original image data P is set as the origin, u-axis is parallel to the horizontal direction (width direction) and v-axis is parallel to the vertical direction (length direction).

In the reduced-image generating processor 11 (shown in FIG. 1), an average value of the 8×8 pixels $P_{vu}$ is calculated in each of the blocks B. Consequently, the reduced-image data R composed of averaged pixels, each value being the average value of each of the blocks B, is generated. For example, as shown in FIG. 3, a block B0, positioned at the s-th block along the u-axis and the t-th block along the v-axis, is transformed to a pixel $R_{ts}$ of the reduced-image data R on the basis of the following formula.

$$R_{ts} = \left( \sum_{u=s\times8}^{s\times8+7} \sum_{v=t\times8}^{t\times8+7} P_{vu} \right) / 64 \quad (1)$$

The pixel $R_{ts}$ is positioned at the s-th pixel along the horizontal direction and the t-th pixel along the vertical direction in the reduced-image data R.

In this way, the reduced-image data R is obtained by calculating the average value of each block B. Namely, the original image data P is compressed. The pixel number of the reduced-image data R is 1/64 of that of the original image data P.

Figure 4:
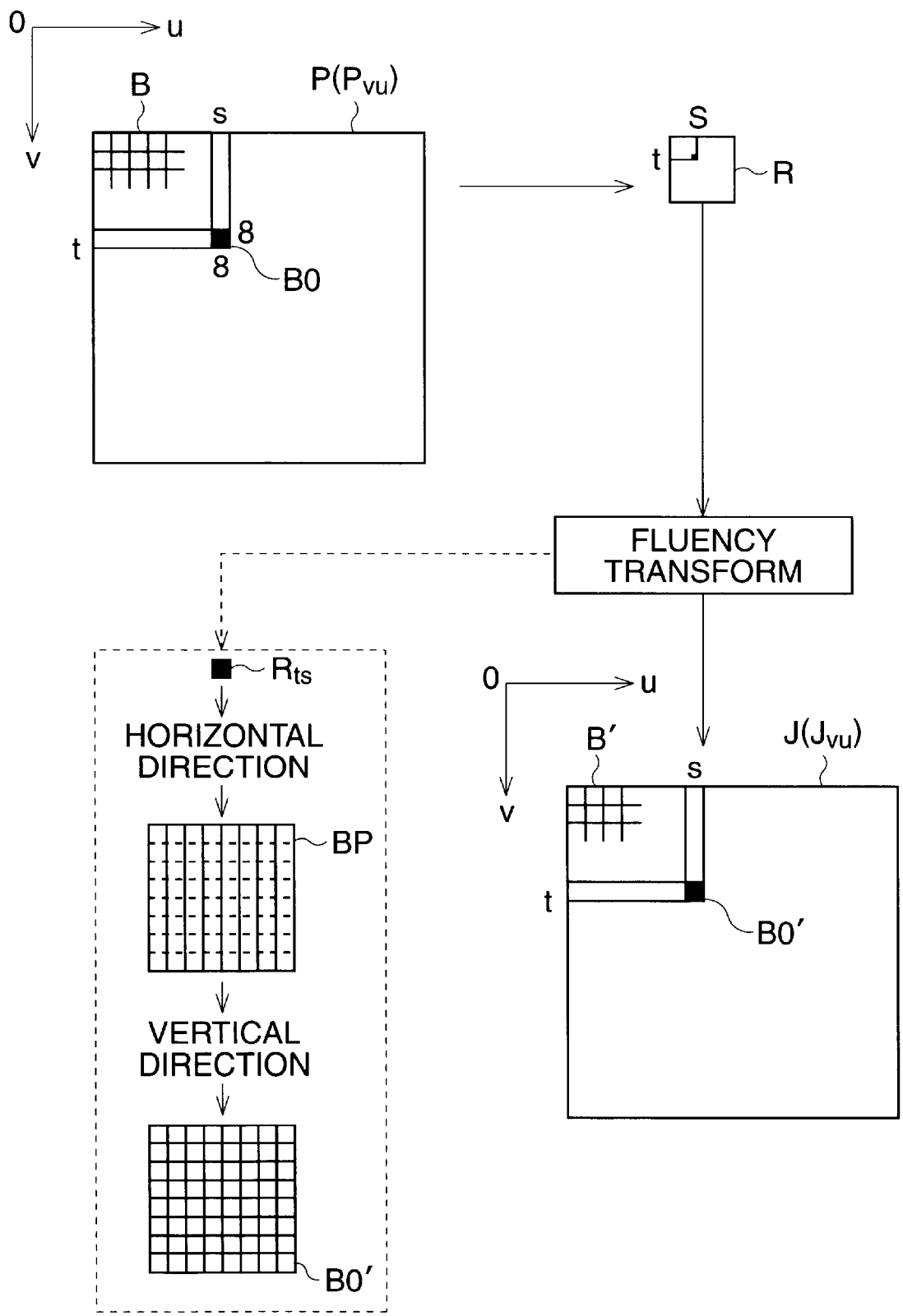
FIG. 4 is a view showing the expansion processing.

FIG. 4 is a view showing the expansion process, executed in the expanded-image generating processor 22 in the image expansion apparatus 20 shown in FIG. 2, and further in the fluency transform processor 13 of the image compression apparatus 10 shown in FIG. 1.

Each pixel of the reduced-image data R is firstly subjected to the fluency transform along the horizontal direction and is secondly subjected to the fluency transform along the vertical direction, so that the blocks B' composed of the 8×8(=64) pixels are generated. For example, when the pixel $R_{ts}$ is subjected to the fluency transform, firstly, a block BP composed of 8 pixels in the horizontal direction is generated. Then, based on the 8 pixels of the block BP, the block B0' composed of 8×8 pixels is generated. The block B0' corresponds to the block B0 in the original image data P.

When all pixels of the reduced-image data R are subjected to the fluency transform, the expanded-image data J partitioned into blocks B' composed of 8×8 pixels ($J_{vu}$) is generated. The number of blocks B' in the expanded-image data J is equal to that of the original image data P.

Herein, pixels in the block B0' that are expressed by "$I'_{yx}$ (0≦x≦7,0≦y≦7)", and the pixels $I'_{y,x}$(0≦x≦7,0 ≦y≦7)" satisfy the following formula. Note that, x-y coordinates are defined with respect to the original image data P, the x-axis is parallel to the horizontal direction and the y-axis is parallel to the vertical direction.

$$J_{t\times8+y,s\times8+x} = I'^{(s,t)}_{yx} \quad (2)$$

In this way, the reduced-image data R is transformed to the expanded-image data J. Namely, the reduced-image data R is expanded.

Figure 5:
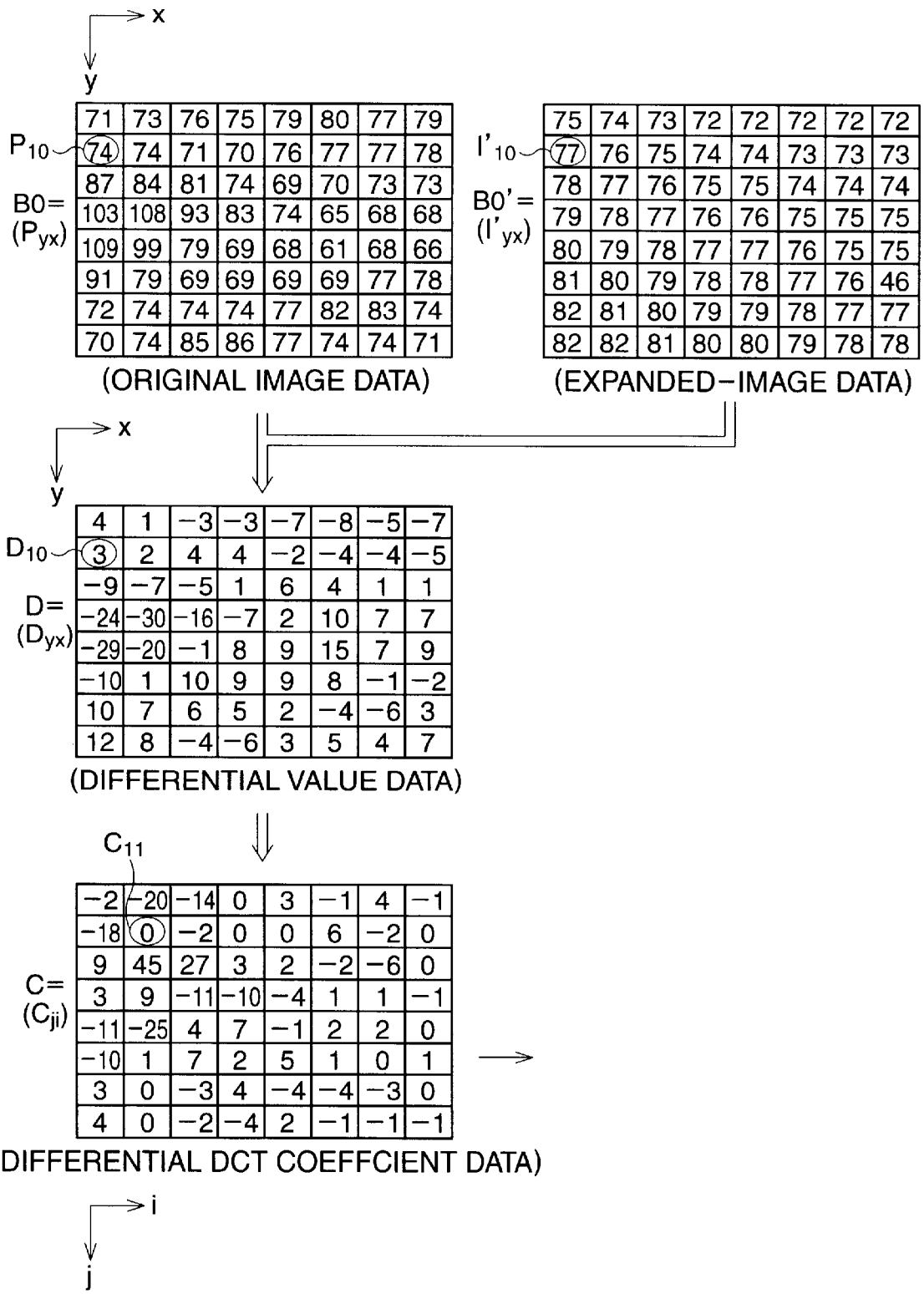
FIG. 5 is a view showing an example of a matrix arrangement of differential values and a matrix arrangement of differential DCT coefficients.

FIG. 5 is a view showing a process, executed in the differential value calculating processor 14 and DCT processor 15. Then, FIG. 6 is a view showing a process executed in the Huffman coding processor 18. Herein, as an example, the block B0' is subjected to the Huffman coding.

In FIG. 5, the block B0, the block B0', a differential value matrix represented by "D" and a differential DCT coefficient matrix represented by "C" is shown. The block B0, B0' are composed of 8×8 pixels $P_{yx}$ and $I'_{yx}$ respectively. Further, the differential value matrix D is composed of 8×8 differential values $D_{yx}$ and the differential DCT matrix $C_{ji}$ is composed of 8×8 differential DCT coefficients. Note that, suffix "j" indicates the vertical direction similar to the y-axis, suffix "i" indicates the horizontal direction similar to the x-axis. For example, when i is "1" and j is "1", the differential DCT coefficient $C_{11}$ is "1" as shown in FIG. 5.

In the first instance, the difference values $D_{yx}$, indicating a difference between the pixels $P_{yx}$ and the corresponding pixels $I'_{yx}$, is obtained by $$D_{yx}=I'_{yx}-P_{yx} \quad (3)$$

For example, substituting a pixel $P_{10}$ (=74) and $I'_{10}$ (=77) for the formula (3), a differential value $D_{10}$ (=3) is obtained.

Then, the differential values $D_{yx}$ are converted to 64 (=8×8) differential DCT coefficients $C_{ji}$ by the DCT processing. The differential DCT coefficient $C_{00}$ (=−2) at position (0,0) is a DC (Direct Current) component, while the remaining 63 differential DCT coefficients $C_{ji}$ are AC (Alternating Current) components. The AC components show how many higher spatial frequency components there are in the differential DCT coefficient matrix C from the differential coefficient $C_{10}$ or $C_{01}$ to the differential DCT coefficient $C_{77}$. The DC component shows an average value of the spatial frequency components of the 8×8 differential values $D_{yx}$ as a whole.

In the second instance, the Huffman coding is performed to the differential DCT coefficient matrix as follows. Note that, as the DC component, or the differential DCT coefficient $C_{00}$ (=−2) is close to "0", the Huffman coding for the AC components is applied to the differential DCT coefficient $C_{00}$. In other words, the Huffman coding for the DC component is not applied.

As shown in FIG. 6, the differential DCT coefficients $C_{ji}$ are zigzag scanned along the arrow direction, and are rearranged into a one-dimensional array. In the array (−2, −20, −18, 9, 0, . . . . . . ), the differential DCT coefficients, the value of which are not "0", are classified by using a categorized table (not shown), thus additional bits are obtained on the basis of corresponding category numbers. On the other hand, when the differential DCT coefficient $C_{ji}$ is "0", a number of consecutive differential DCT coefficients equal to "0" are counted in the one-dimensional array, thus a length of consecutive "0s", namely, a zero run length Z is obtained. Encoded bit data is then obtained by combining the category number H and the zero run length Z.

As an example, in the case of the differential DCT coefficient $C_{10}$ (=−18), the category number H is "5", thus the additional bits "01101" are obtained. As no differential DCT coefficient of "0" exist in front and behind, the zero run length Z is "0". Therefore, the category number H (=5) and the zero run length Z (=0) is represented by "05" as shown in FIG. 6. Then, based on the zero run length Z (=0) and the category number H (=5), a Huffman table (not shown) is referenced to, so that code-word "11010" is obtained. by combining the additional bits "01101" and the codeword "11010", the encoded bit data "1101001101" is obtained. In the same way, other differential DCT coefficients $C_{ji}$ are subject to the Huffman coding, so that one block worth of the encoded bit data is obtained.

When the Huffman coding is applied to one frame worth of the object image, the encoded bit data is recorded in the recording area M3. The Huffman table and the table for categorizing are default tables, which are used in a conventional JPEG Baseline algorithm.

In the image expansion apparatus 20, the Huffman decoding and the IDCT processing, which are the inverse of the Huffman coding and the DCT processing shown in FIGS. 5 and 6 respectively, are executed. Then, as described above, based on the differential value and the expanded-image data J, the original image data P is obtained. For example, regarding the blocks B0, B0', the original image data $P_{yx}$ is obtained by $$P_{yx} = I'_{yx} - D_{yx} \quad (4)$$

Hereinafter, with reference to FIGS. 7 to 13, the fluency transform is explained. Since the fluency transform is based on a fluency function, the fluency function will be described before the explanation of the fluency transform.

The fluency function, named by professors Kamada and Toraichi, is known as a function, which can represent various signals appropriately, for example, disclosed in a Mathematical Physics Journal (SURI-KAGAKU) No. 363, pp 8–12 (1993), published in Japan.

To begin with, a fluency function space is defined as follows:

It is supposed that a function space composed of a staircase (scaling) function, which is obtained on the basis of a rectangular function represented by formula (5), is represented as shown in the following formula (6), the fluency function space is defined by formula (7).

$$\chi(t) = \begin{cases} 1, & |t| \leq 1/2 \\ 0, & \text{otherwise} \end{cases} \quad (5)$$

$$^1S := \left\{ f : R \to C \mid f(t) = \sum_{n=-\infty}^{\infty} b_n \chi(t-n), \{b_n\} \in l^2 \right\} \quad (6)$$

$$^mS := \quad (7)$$
$$\left\{ h : R \to C \mid h(t) = \int_{-\infty}^{\infty} f(t-\tau)g(\tau)d\tau, \ f \in {}^{m-1}S, \ g \in {}^1S \right\} (m \geq 2)$$

The fluency function space of order m "$^mS$" is constructed by a function system, composed of (m−2)-times continuously differentiable piecewise polynomial of degree m−1. The fluency function is a staircase (scaling) function when m is 1. The formula (5), which represents rectangular function, indicates a sampling basis at order m=1, and the formula (6) indicates the fluency function space at order m=1. The fluency function space $^mS$ is a series of a function space, which can connect from a staircase function space (m=1) to a Fourier band-limited function space (m=∞). Note that, a continuous differentiability m is regarded as a parameter.

The function system, characterizing the fluency function space $^mS$ and corresponding to an impulse response, is derived from a biorthogonal sampling basis theorem composed of a sampling basis and its biorthogonal basis. In this theorem, an arbitrary function $f \in {}^mS$ satisfies the following formulae (8) and (9) for a sampling value $f_n := f(n)$.

$$f(t) = \sum_{n=-\infty}^{\infty} f_n {}_{[^mS]}\phi(t-n) \quad (8)$$

$$f_n = \int_{-\infty}^{\infty} f(t)\overline{{}_{[^mS^*]}\phi(t-n)}dt \quad (9)$$

where ${}_{[^mS]}\phi \in {}^mS$ satisfying $${}_{[^mS]}\phi \in {}^mS = (1/2\pi)\int_{-\infty}^{\infty}\left\{\sum_{q=-\infty}^{\infty}[(-1)^q(1-q(2\pi/\omega))]^m\right\}^{-1} \times \exp(i\omega t)d\omega$$

on the other hand, ${}_{[^mS^*]}\phi \in {}^mS$ satisfying $$\int_{-\infty}^{\infty} {}_{[^mS]}\phi(t-n)\overline{{}_{[^mS^*]}\phi(t-p)}dt = \begin{cases} 1, & p=n \\ 0, & p \neq n \end{cases}$$

The formula (8) indicates a function of the fluency transform derived from the sample value, and represents an expansion form, in which the sampling value sequences is a expansion coefficient. On the other hand, the formula (9) indicates a function of the fluency inverse transform derived from the function of the fluency transform, and represents an operator, which obtains the sampling value sequences from the function of the fluency transform in the form of a integral transform. Note that, p is an arbitrary integer, and a bar expressed above "φ" in the formula (9) represents a conjugated complex of φ.

Further, in the fluency function space $^mS$, an orthogonal transform is derived from a fluency transform theorem. The orthogonal transform provides a generalization of a frequency concept in terms of agreement with Fourier transform at m=∞, and characterizes a harmonic structure. The theorem satisfies the following two formulae for an arbitrary function $f \in {}^mS$.

$$f(t) = (1/2\pi)\int_{-\pi}^{\pi} F(u)_{[^mO]}\phi(t,u)du \quad (10)$$

$$F(u) = \int_{-\infty}^{\infty} f(t)\overline{{}_{[^mO]}\phi(t,u)} dt \quad (11)$$

where $${}_{[^mO]}\phi(t,u) = (1/2\pi)\int_{-\infty}^{\infty}\left\{\sum_{p=-\infty}^{\infty}\delta(\omega-u+2\pi p)\right\} \times$$
$$\left\{\sum_{q=-\infty}^{\infty}(1-q(2\pi/\omega))^{-2m}\right\}^{-1/2} \times \exp(i\omega t)d\omega$$

Note that, φ (t,u) is a function of the fluency function space $^mS$ and is expressed by using a Dirac delta function δ. "u" is an arbitrary variable.

The formula (10) is designated as a fluency orthogonal transform, and the formula (11) is designated as a fluency inverse orthogonal transform.

The fluency orthogonal transform expressed by the formula (10) can transform discrete sample values to continuous function values. Accordingly, in this embodiment, the fluency orthogonal transform is utilized for expanding the reduced-image data. Namely, the fluency transform is executed to each pixel of the reduced-image data R, and then the expanded-image data J is generated on the basis of the continuous function values.

Herein, some concrete fluency functions are explained. The order "m" of the fluency function space $^mS$ can be expressed as a parameter "m" of the fluency function, and when the parameter "m" is set to "1,2, . . . " in order, the fluency function are represented as shown below.

The most simple function system in the fluency function is obtained by setting the function "$f(t) \epsilon^1 S$" in the formula (6) to the rectangular function, which is represented by "$\chi(t)$" in the formula (5), in place of the staircase function, and setting the function $g \epsilon^1 S$ represented in the formula (7) to the above rectangular function "$f(t)$". Namely, the function $f(t)$ represented in the formula (6) becomes a rectangular function by applying a Delta ($\delta$) function to an input function of the formula (6) in place of the rectangular function expressed by the formula (5). Then, the rectangular function $f(t)$ is utilized for a function of the convolution integral in place of the function $g(\tau)$ represented in the formula (7), when transforming the function space $^{m-1}S$ to the function space $^mS$.

Figure 7A:
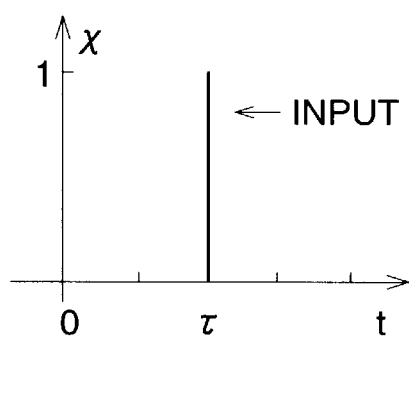
FIGS. 7A, 7B, 7C and 7D are views showing fluency functions varying with parameter m.

An input value at the formula (6) becomes the $\delta$ function shown in FIG. 7A in place of the rectangular function $\chi(t)$ represented in the formula (5). The value of the $\delta$ function is 1 when variable t is $\tau$, and is 0 when variable t is not $\tau$. The fluency function $f(t)$ with the parameter m=1 is represented as following formula, in place of the formula (6).

$$f(t) = \sum_{n=-\infty}^{\infty} \chi_n \chi(t-n) = \begin{cases} 1, & \tau - 1/2 < t < \tau + 1/2 \\ 0, & \text{otherwise} \end{cases} \quad f(t) \in^1 S \quad (12)$$

Figure 7B:
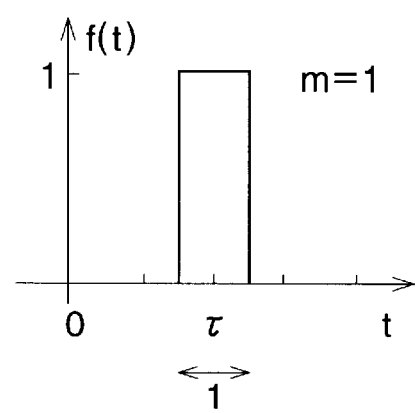

The fluency function $f(t)$ in the formula (12) becomes a rectangular function, as shown in FIG. 7B. Then, the fluency function with the parameter m=2, denoted by "$g(t)$", is found by executing the convolution integral, on the basis of the rectangular function $f(t)$, as shown in the following formula.

$$g(t) = \int_{-\infty}^{\infty} f(t-\tau)f(\tau)d\tau = \begin{cases} t-\tau+1, & \tau-1 < t \leq \tau \\ -t+\tau+1, & \tau < t < \tau+1 \\ 0, & \text{otherwise} \end{cases} \quad g(t) \in^2 S \quad (13)$$

Figure 7C:
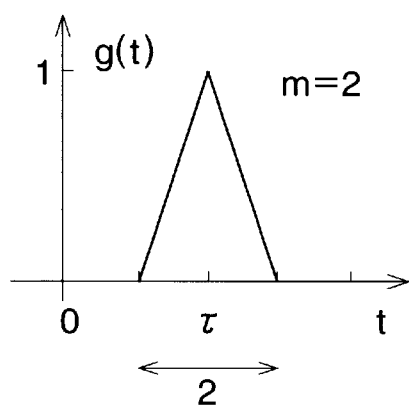

The fluency function $g(t)$ obtained by the formula (13) is, as shown in FIG. 7C, a triangular function.

When the parameter m is 3, 4, 5 . . . , the convolution integral is executed, similarly to the parameter m=2. Namely, based on the fluency function at the parameter "m−1" and the function $f(t)$ represented in the formula (12), the convolution integral is executed, so that the fluency function with the parameter m is generated. For example, when the parameter m is 3, based on the function $g(t)$ obtained by the formula (13) and the function $f(t)$ in the formula (12), the convolution integral is executed, so that a fluency function $h(t)$ shown in FIG. 7D, which is smooth and expressed by a curve, is generated. The fluency function $h(t)$ is expressed as $$h(t) = \int_{-\infty}^{\infty} g(t-\tau)f(\tau)d\tau \quad h(t) \in^3 S = \quad (14)$$

-continued
$$\begin{cases} -\frac{1}{4}(t-\tau+2)^2, & \tau-2 < t < \tau-\frac{3}{2} \\ \frac{3}{4}(t-\tau+1)^2 + \frac{1}{2}(t-\tau+1), & \tau-\frac{3}{2} \leq t < \tau-1 \\ \frac{5}{4}(t-\tau+1)^2 + \frac{1}{2}(t-\tau+1), & \tau-1 \leq t < \tau-\frac{1}{2} \\ -\frac{7}{4}(t-\tau)^2 + 1, & \tau-\frac{1}{2} \leq t < \tau+\frac{1}{2} \\ \frac{5}{4}(t-\tau-1)^2 - \frac{1}{2}(t-\tau-1), & \tau+\frac{1}{2} \leq t < \tau+1 \\ \frac{3}{4}(t-\tau-1)^2 - \frac{1}{2}(t-\tau-1), & \tau+1 \leq t < \tau+\frac{3}{2} \\ -\frac{1}{4}(t-\tau-2)^2, & \tau+\frac{3}{2} \leq t < \tau+2 \\ 0, & \text{otherwise} \end{cases}$$

In this way, the fluency function varies with the parameter m. The fluency functions, shown in FIGS. 7B to 7D, correspond to sampling bases related to the fluency function space $^mS$ disclosed in the Mathematical Physics Journal described above. In this embodiment, the fluency transform (orthogonal transform) to the reduced-image data R is executed on the basis of the fluency function in the case of the parameter m=1, 2 and 3.

Figure 8:
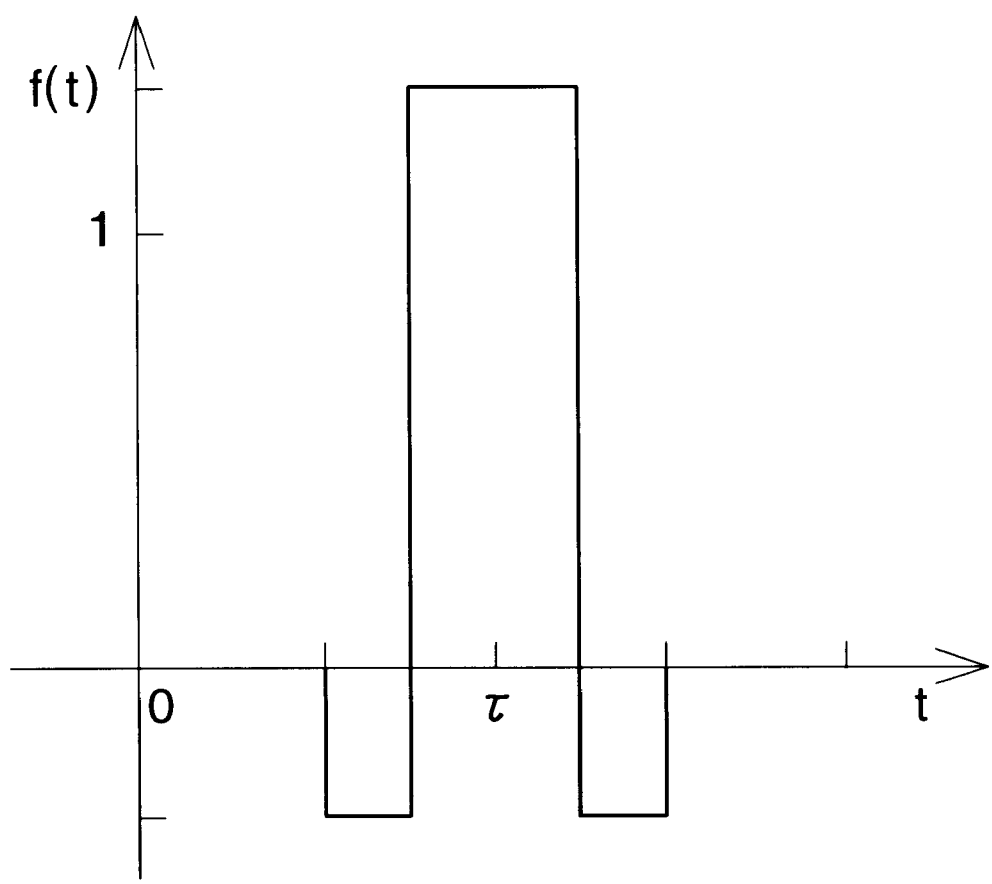
FIG. 8 is a normalized fluency function at the parameter m=1.

However, if the function $f(t)$, obtained by the formula (12) and shown in FIG. 7B, is directly utilized at the convolution integral at the parameter m$\geq$3, the value of the fluency function at t=$\tau$ does not coincide with 1. Accordingly, in this embodiment, normalized function shown in FIG. 8 is applied to the convolution integral in place of the function $f(t)$ shown in FIG. 7B. The normalized function $f(t)$ is normalized as for an area, which is formed on the basis of the t-axis and the function $f(t)$, such that the area of the function $f(t)$ is always 1. For example, when the parameter m is 3, the normalized function $f(t)$ is represented by $$f(t) = \begin{cases} -\frac{1}{3}, & \tau-1 < t \leq \tau-\frac{1}{2} \\ \frac{4}{3}, & \tau-\frac{1}{2} < t \leq \tau+\frac{1}{2} \\ -\frac{1}{3}, & \tau+\frac{1}{2} < t < \tau+1 \\ 0, & \text{otherwise} \end{cases} \quad (15)$$

Thus, the value of the fluency function is always 1 at t=$\tau$.

Figure 9:
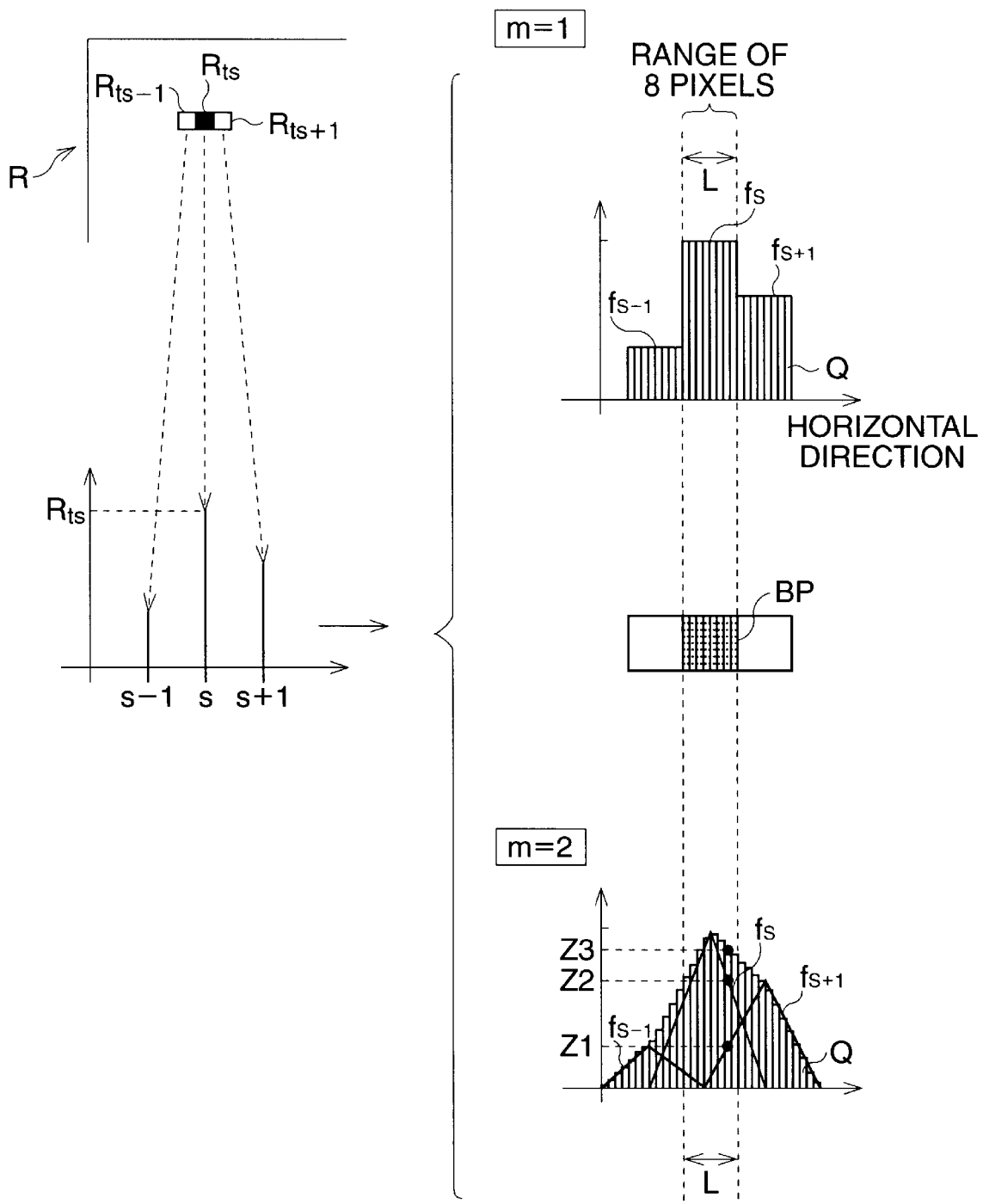
FIG. 9 is a view showing a fluency transform processing.

FIG. 9 is a view showing the fluency transform for generating the expanded-image data J. Note that, for ease of explanation, the fluency transform is executed for only the horizontal direction, or u-axis.

Herein, as one example, three pixels $R_{ts-1}$, $R_{ts}$, $R_{ts+1}$, adjoining each other in the reduced-image data R, are subjected to the fluency transform by the formula (10) along the horizontal direction. Each pixel value of the three pixels $R_{ts-1}$, $R_{ts}$, $R_{ts+1}$ is different respectively. The input function F(u) at the formula (10) corresponds to each pixel value of the three pixels $R_{ts-1}$, $R_{ts}$, $R_{ts+1}$.

When the input function F(u) at the formula (10) is a discrete value corresponding to $\delta$ function, the output function $f(t)$ in the formula (10) corresponds to the fluency functions shown in FIGS. 7A to 7D. Therefore, by the fluency orthogonal transform, the output function $f(t)$ having continuous values is generated. When the parameter m=1, an output function $f_s$, obtained by executing the fluency transform to the pixel value $R_{ts}$, is a rectangular function, as shown in FIG. 9. Each pixel value of 8 pixels along the horizontal direction (x-axis) in the block BP, represented by a bar "Q", is equal.

Then, when the parameter m is 1, the range of the output function $f_s$ along the horizontal direction corresponds to the range of the horizontal direction of the block BP (represented by "L" in FIG. 9). The range of the output functions $f_{s-1}$, $f_{s+1}$, obtained by executing the fluency transform to the pixel values $R_{ts-1}$, $R_{ts+1}$, does not overlap the range of the output function $f_s$.

On the other hand, when the parameter m is 2, each of the functions $f_{s-1}$, $f_s$, $f_{s+1}$, obtained by the formula (10) and corresponding to the pixel value $R_{ts-1}$, $R_{ts}$, $R_{ts+1}$ respectively, is a triangular function. In the case of the parameter m=2, each range of functions $f_{s-1}$, $f_s$, $f_{s+1}$ overlaps each other, as the range L of the block BP is defined in accordance with the parameter m=1. The difference between the range of the function f(t) at the parameter m=1 and that of the function f(t) at the parameter m=2 is shown in FIGS. 7B and 7C.

Accordingly, each pixel value, represented by the bar Q, is obtained by adding each value of the functions $f_{s-1}$, $f_s$, $f_{s+1}$. Namely, each value of the functions $f_{s-1}$, $f_s$, $f_{s+1}$, corresponding to each position of 8 pixels in the horizontal direction of the block BP, is added, so that each pixel value of 8 pixels along the horizontal direction is obtained. For example, using the second pixel from the right end in the block BP, the pixel value Z3 is obtained by adding the pixel value Z2, which is the value of the function $f_s$, and the pixel value Z1, which is the value of the function $f_{s+1}$ (See FIG. 9).

Figure 7D:
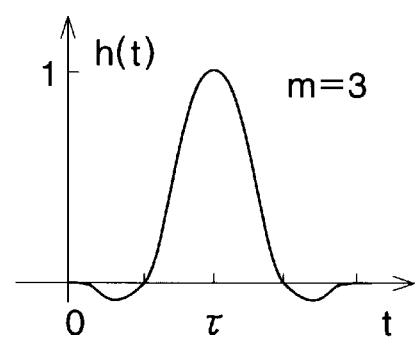

As the parameter "m" becomes large, the range of the function f(t) along the horizontal direction becomes larger, as shown in FIG. 7D. In this case, each pixel value of the block BP, corresponding to the pixel $R_{ts}$ is calculated on the basis of the pixel value $R_{ts-1}$, $R_{ts+1}$ and other adjacent pixels in the reduced-image data R.

After the fluency transform along the horizontal direction is executed, the fluency transform along the vertical direction is executed to the block BP, so that the block B0' composed of 8×8 pixels is generated. Namely, when executing the fluency transform along the horizontal direction and the vertical direction for each pixel of the reduced-image data R in order, the expanded-image data J is generated. Each pixel value of the expanded-image data J depends upon the parameter m, and the parameter m is the mode of the fluency transform.

With reference to FIGS. 10 to 13, expansion processing by the fluency transform is explained. In this embodiment, the parameter m is one of 1 to 3, and adjacent pixels to the pixel $R_{ts}$, necessary for finding each pixel of the block BP, are represented by $R_{ts-2}$, $R_{ts-1}$, $R_{ts+1}$, $R_{ts+2}$, $R_{ts-2s}$, $R_{t-1s}$, $R_{t+1s}$, $R_{t+2s}$. Note that, values of the pixels $R_{ts-2}$, $R_{ts-1}$, $R_{ts+1}$, $R_{ts+2}$, $R_{t-2s}$, $R_{t-1s}$, $R_{t+1s}$, $R_{t+2s}$ are also expressed by "$R_{ts-2}$, $R_{ts-1}$, $R_{ts+1}$, $R_{ts+2}$, $R_{t-2s}$, $R_{t-1s}$, $R_{t+1s}$, $R_{t+2s}$".

Figure 10:
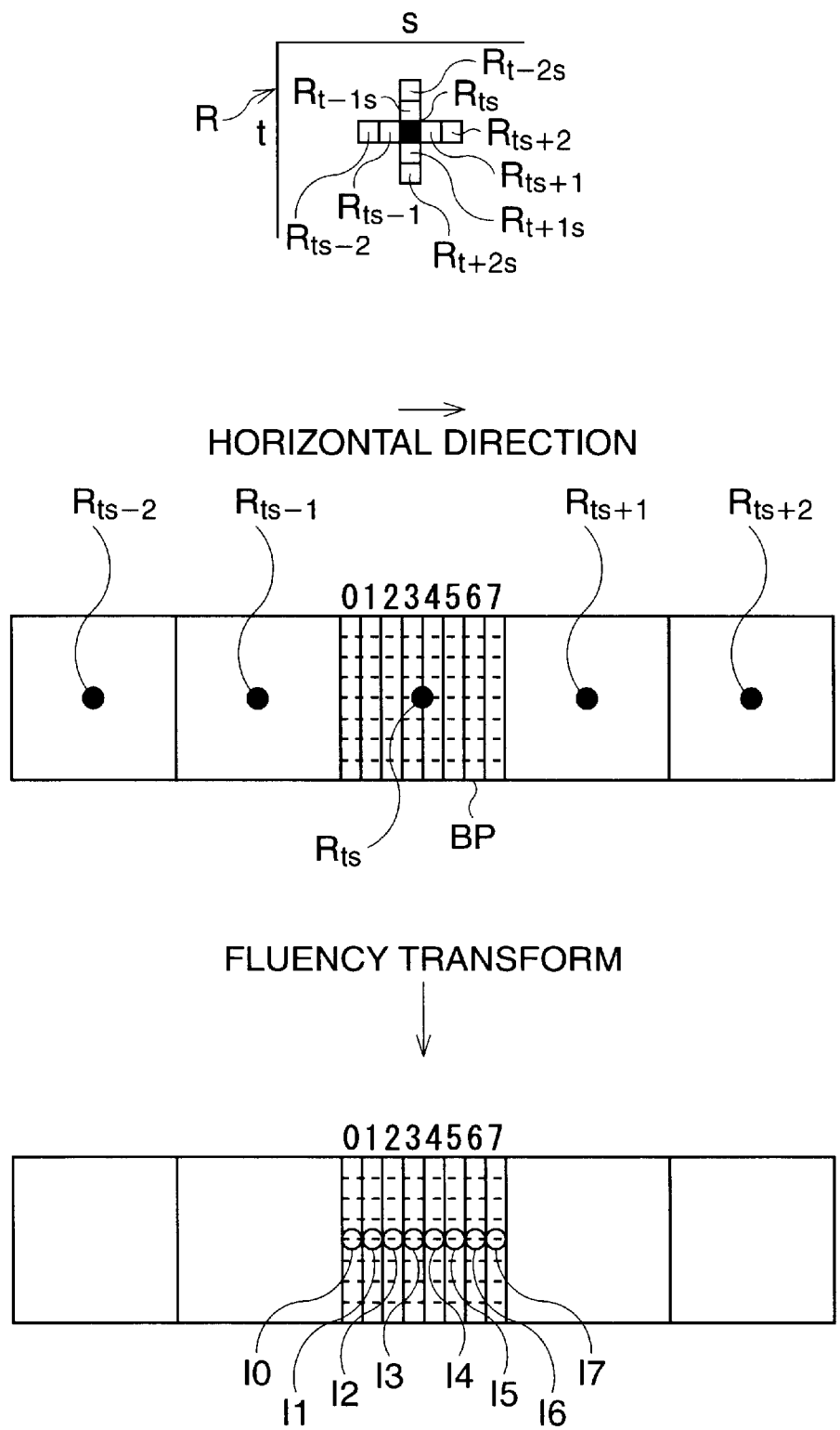
FIG. 10 is a view showing the fluency transform along a horizontal direction.

FIG. 10 is a view showing the fluency transform along the horizontal direction (width direction). The positions of 8 pixels in the block BP are expressed by "0, 1, 2 . . . 7" in order.

Firstly, the pixel $R_{ts}$, is arranged at the center of the generated block BP (between the third and fourth position), and then the fluency transform at the parameter m (=1, 2 or 3) is executed along the horizontal direction. Similar to the pixel $R_{ts}$, the pixels $R_{ts-2}$, $R_{ts-1}$, $R_{ts+1}$, $R_{ts+2}$, $R_{t-2s}$, $R_{t-1s}$, $R_{t+1s}$, $R_{t+2s}$ are subject to the fluency transform in the horizontal direction, at the center of each block generated by the fluency transform. 8 pixels, represented by "I0, I1, I2, I3, I4, I5, I6, I7" in FIG. 10, are based on the pixels $R_{ts-2}$, $R_{ts-1}$, $R_{ts}$, $R_{ts+1}$, $R_{ts+2}$.

FIG. 11 is a view showing a table T1 indicating 8 pixel values along the horizontal direction in the block BP obtained by the fluency transform. In the table T1, pixel values corresponding to the parameter 1, 2 and 3 respectively, are shown, and each pixel value is obtained on the basis of the formula (10). Herein, pixel values along the horizontal direction are also represented by "I0, I1, I2, . . . I7", which are identical with the 8 pixels along the horizontal direction.

For example, when the parameter m is 1, all of the pixel values I0 to I7 coincide with the pixel value $R_{ts}$. As described above using FIG. 9, the pixel values $R_{ts-2}$, $R_{ts-1}$, $R_{ts+1}$, $R_{ts+2}$ except for the pixel value $R_{ts}$ in the reduced-image data R do not affect the generation of the pixel values I0 to I7 when the parameter m=1. On the other hand, when the parameter m is 2, the pixel values I0 to I7 are generated on the basis of the pixel values $R_{ts-1}$, $R_{ts}$, $R_{ts+1}$ and the addition of the value of the function $f_{s-1}$, $f_s$, $f_{s+1}$ at the formula (10), as shown in FIG. 9. Namely, the pixel values I0 to I7 are respectively generated by adding each value of the functions $f_{s-1}$, $f_s$, $f_{s+1}$, which correspond to the pixel position. When the parameter m is 3, the pixel values I0 to I7 are obtained on the basis of the pixel values $R_{ts-2}$, $R_{ts-1}$, $R_{ts}$, $R_{ts+1}$, $R_{ts+2}$. After the fluency transform in the horizontal direction is executed, the fluency transform in the vertical direction (y-axis) is executed to the block BP composed of 8 pixels I0 to I7.

Figure 12:
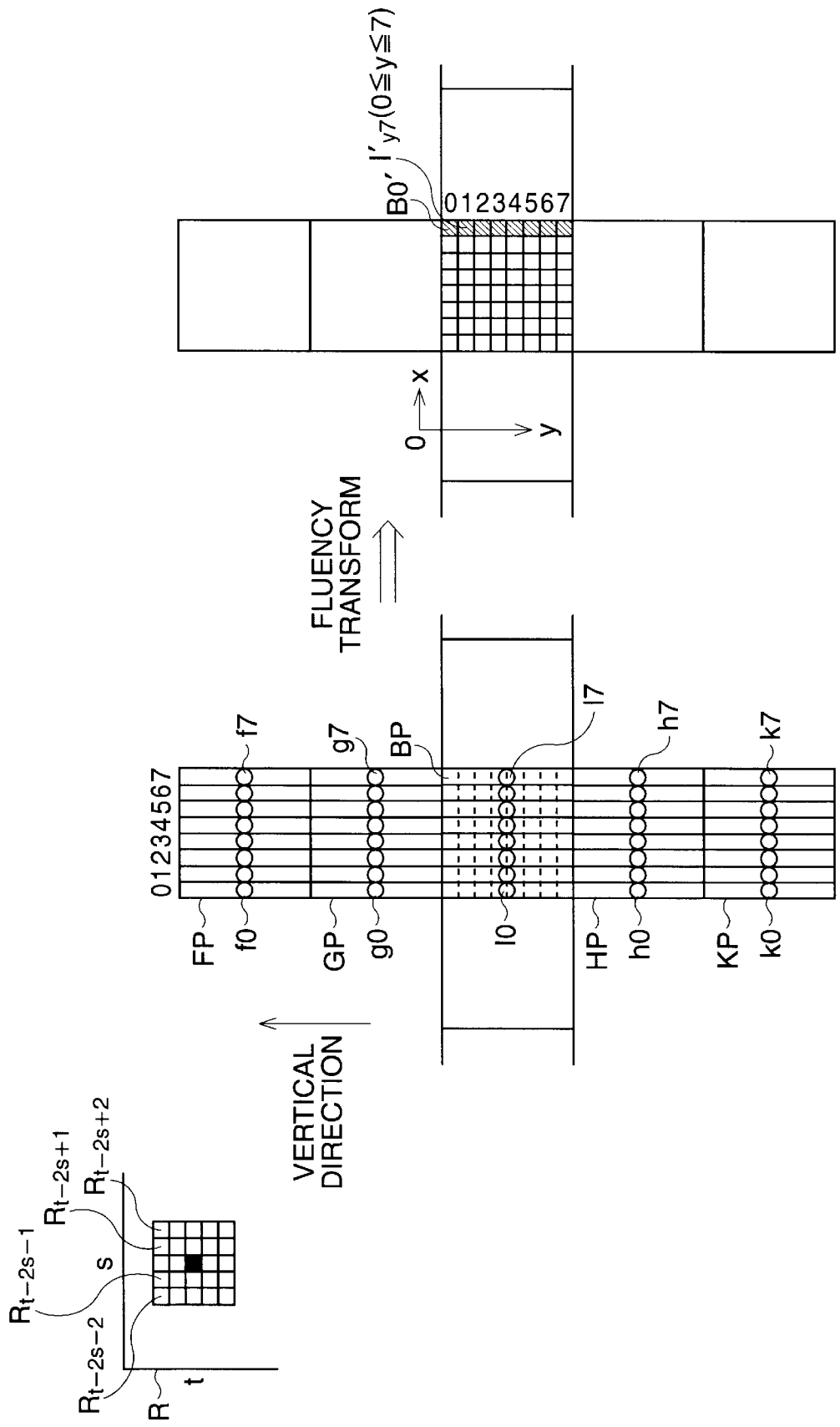
FIG. 12 is a view showing the fluency transform along a vertical direction.

FIG. 12 is a view showing the fluency transform along the vertical direction. Similarly to the horizontal direction, the positions of 8 pixels along the vertical direction are expressed by "0, 1, 2, . . . 7" in order.

When the fluency transform along the horizontal direction is executed to each pixel of the reduced-image data R, blocks FP, GP, HP, KP, corresponding to the pixels $R_{t-2s}$, $R_{t-1s}$, $R_{t+1s}$, $R_{t+2s}$ respectively, are obtained. Each pixel of the blocks FP, GP, HP, KP is designated by "f0, f1, . . . f7", "g0, g1, . . . g7", "h0, h1, . . . h7", "k0, k1, . . . k7", respectively. Note that, Each pixel of the blocks FP, GP, HP, KP is obtained on the basis of other adjacent pixels in the reduced-image data R in addition to $R_{ts-2}$, $R_{ts-1}$, $R_{ts}$, $R_{ts+1}$, $R_{ts+2}$. For example, "f0, f1, f7" of the block FP is obtained by "$R_{t-2s-2}$, $R_{t-2s-1}$, $R_{t-2s}$, $R_{t-2s}$, $R_{t-2s+2}$.

The 8 pixels "I0, I1, I2, . . . I7" are subjected to the fluency transform along the vertical direction at the center of the block BP (between the third position and the fourth position), on the basis of the formula (10). The other pixels "f0, f1, . . . f7", "g0, g1, . . . g7", "h0, h1, . . . h7", "k0, k1, . . . k7" are also subjected to the fluency transform along the vertical direction respectively, similar to the 8 pixels I0 to I7. Then, 8×8 pixels of the block B0' are obtained by adding each value of: (a) The output values f(t) (at the formula (10)) based on the pixels "f0, f1, . . . f7" corresponding to the pixel positions "0, 1, 2, . . . 7", (b) The output functions f(t) based on the pixels "g0, g1, . . . g7" corresponding to the pixel positions "0, 1, 2, . . . 7", (c) The output values f(t) based on the pixels "I0, I1, . . . I7" corresponding to the pixel positions "0, 1, 2, . . . 7", (d) The output values f(t) based on the pixels "h0, h1, . . . h7" corresponding to the pixel positions "0, 1, 2, . . . 7", (e) The output values f(t) based on the pixels "k0, k1, . . . k7" corresponding to the pixel positions "0, 1, 2, . . . 7". The pixel value of the block B0' is denoted by $I'_{yx}$ ($0 \leq x \leq 7$, $0 \leq y \leq 7$), as described above.

FIG. 13 is a view showing a table T2 representing 8 pixel values $I'_{y7}$ ($0 \leq y \leq 7$), shown by oblique line in FIG. 12. When the parameter m is 1, all of the pixel values $I'_{y7}$ are I7, when the parameter m is 2, the pixel values $I'_{y7}$ are obtained on the basis of the pixel values I7, g7, h7. When the parameter m is 3, the pixel values $I'_{y7}$ are obtained on the basis of the pixel values f7, g7, I7, h7, k7. Other pixels $I_{yx}$ ($0 \leq x \leq 6$, $0 \leq y \leq 7$) are also obtained on the basis of the pixels fx, gx, Ix, hx, kx (x=0 to 6). In this case, the pixel values $I_{yx}$ ($0 \leq x \leq 6$, $0 \leq y \leq 7$) are obtained by substituting fx, gx, Ix, hx, kx (x=0 to 6) for f7, g7, I7, h7, k7 represented in the table T2.

In this way, the block B0' corresponding to the block B0 composing the original image data P is generated by executing the fluency transform along the horizontal and the vertical direction. The fluency transform is executed for each pixel of the reduced-image data R in order, so that all of the block B' is generated, namely, the expanded-image data J is obtained.

Figure 14:
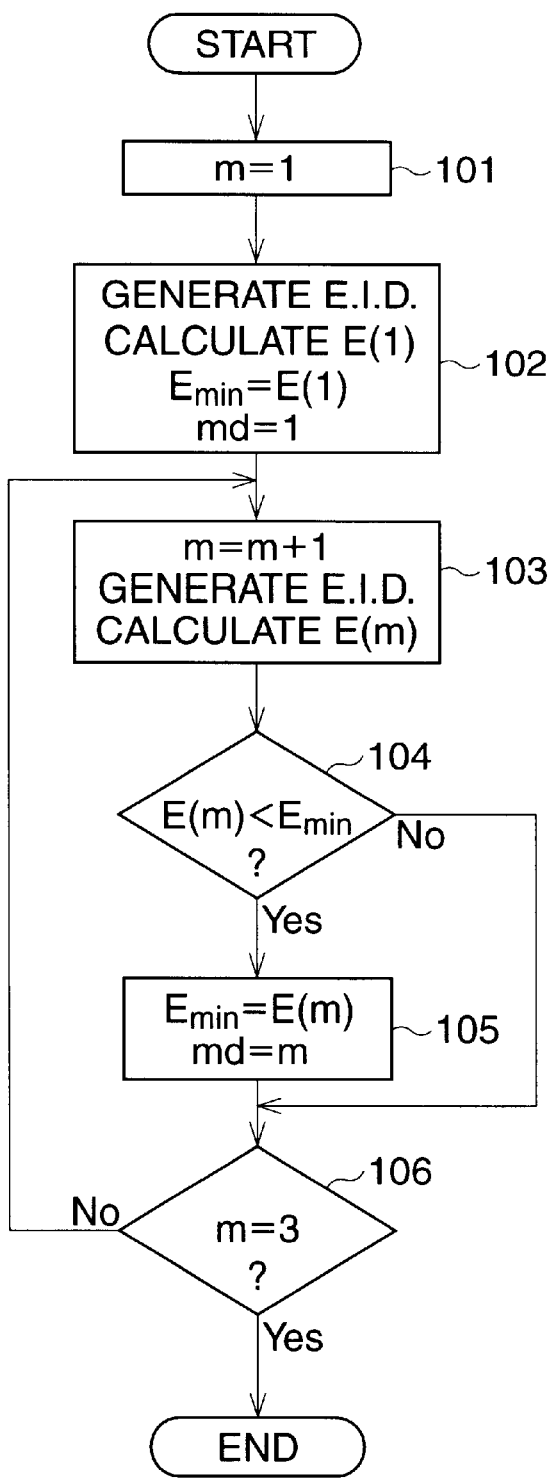
FIG. 14 is a view showing a flowchart of the process for determining the optimum mode.

FIG. 14 is a view showing a flowchart of the process for determining the optimum mode. In FIG. 14, the optimum mode for the block B0' is determined.

In Step 101, the parameter m is set to 1. Then, in Step 102, the block B0' composed of 8×8 pixels is generated by the fluency transform, and then the code-length E(m) at parameter m=1, represented by E(1), is calculated. The code-length E(m) is equal in value to a bit length of the encoded bit data of one block.

The calculation of the code-length is partially different from that of the Huffman coding. Firstly, similarly to the Huffman coding, the differential DCT coefficient matrix is zigzag scanned. Then, the differential DCT coefficients $C_{ji}$, which is not "0", are categorized using the categorization table so that a length of the additional bits (not additional bits) are obtained. Further, when the zero run length Z is obtained from the differential DCT coefficients $C_{ji}$ of "0", based on the category number H and the zero run length Z, a length of the Huffman code-word (not the Huffman code-word) is obtained using the Huffman table. Then, the length of the additional bits and the length of the Huffman code-word is added sequentially, so that the code-length of the encoded bit data is calculated without generating the encoded bit data. Note that, the above calculation is conventionally well known.

Furthermore, at Step 102, an optimum parameter "md", namely, the optimum mode, is set to 1, and then a minimum code-length $E_{min}$ is set to E(1).

In Step 103, the parameter m is incremented by 1, and the code-length E(m) is calculated on the basis of the incremented parameter m.

In Step 104, it is determined whether the code-length E(m) obtained at Step 103 is smaller than the minimum code-length $E_{min}$. When it is determined that the code-length E(m) is smaller than the minimum code-length $E_{min}$, the process goes to Step 105, wherein the code-length E(m) is newly set to the minimum code-length $E_{min}$, and the parameter m is set to the optimum parameter md. After Step 105 is executed, the process goes to Step 106. On the other hand, when it is determined that the code-length E(m) is not smaller than the minimum code-length $E_{min}$ at Step 104, the process skips Step 105 and directly goes to Step 106.

In Step 106, it is determined whether the parameter m is 3. When it is determined that the parameter m is 3, the process for determining the optimum mode is terminated. On the other hand, when it is determined that the parameter m is not 3, the process returns to Step 103.

Steps 103 to 106 are repeatedly executed, thus the optimum mode md, which makes the code-length E(m) minimum, is determined among 1 to 3.

The process is executed to all the other blocks in the expanded-image data J, similarly to the block B0', so the optimum mode is determined for each block.

In this way, in this embodiment, the original image data P is transformed to the reduced-image data R, and is recorded in the recording medium M in the image compression apparatus 10. Further, the reduced-image data R is subjected to the fluency transform so as to generate the expanded-image data J, and the differential value data indicating the difference between the original image data P and the expanded-image data J is obtained in the image compression apparatus 10. The differential value data is subjected to the Huffman coding, so that encoded bit data is obtained and recorded in the recording medium M. In the image expansion apparatus 20, the recorded reduced-image data R is transformed to the expanded-image data J, and the encoded bit data is transformed to the differential value data. Then, the original image data P is restored on the basis of the differential value data and the expanded-image data J. As the expanded-image data J is generated and differential value data is obtained in the image compression apparatus 10 in advance, the original image data P is perfectly restored in the image expansion apparatus 20. Then, as the differential value data is Huffman encoded, the bit length (the amount of bit data) recorded in the recording medium M is decreased. Hence, the original image data P is efficiently compressed, while maintaining the picture quality.

As the fluency transform is performed in the expansion processing, the difference between each pixel of the original image data P and the corresponding pixel of the expanded-image data J is smaller in comparison with that of the linear interpolation. Namely, each pixel value of the difference value data is relatively small. Accordingly, the bit length of the encoded bit data is decreased so that the original image data P is efficiently compressed.

The optimum mode, which makes the code-length minimum, is determined among the parameter m=1 to 3, thus the bit length of the encoded bit data is suppressed. Furthermore, as the optimum mode is determined in each block in the expanded-image data J, the bit length of the encoded bit data is further decreased.

Note that, the differential DCT coefficient data may be quantized. Namely, a quantization processor may be provided between the DCT processor 15 and the Huffman coding processor 18. In this case, the differential DCT coefficient data is quantized, and the code-length necessary for the Huffman coding is calculated on the basis of the differential DCT coefficient data. Then, the inverse quantization is executed to the differential DCT coefficient data in the image expansion apparatus 20.

With reference to the orthogonal transform, a Hadamard transform may be applied in place of the DCT processing executed in the DCT processor 15. In this case, an inverse Hadamard transform is executed in the image expansion apparatus 20. Further, an Arithmetic coding, which is one of the Entropy coding, may be applied in place of the Huffman coding in the image compression apparatus 10. In this case, an Arithmetic decoding is executed in the image expansion apparatus 20.

The range of the parameter m is not restricted to 1 to 3, and may be set to an arbitrary range (for example, 1 to 5).

When obtaining the reduced-image data R, other methods, such as a down sampling method transforming an image-resolution, can be applied in place of the calculation of the average value. Further, in place of the digital still camera, a program executing the image compression and expansion described above may be stored in a memory in a computer system so as to compress and expand the image data recorded in the computer system.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 11-257095 (filed on Sep. 10, 1999) which is expressly incorporated herein, by reference, in its entirety.

What is claimed is:

1. A compression apparatus for compressing image data comprising:

a reduced-image generating processor that transforms original image data partitioned into first blocks, each of which is composed of a plurality of pixels, to reduced-image data composed of a smaller number of pixels than that of said original image data;

a fluency transform processor that applies a fluency transform to said reduced-image data so as to generate expanded-image data partitioned into second blocks corresponding to said first blocks, said fluency transform having a plurality of modes;

a differential value calculating processor that obtains differential value data indicating a difference between said original image data and said expanded-image data;

an orthogonal transform processor that obtains orthogonal transform coefficient data by applying an orthogonal transform to said differential value data;

a mode setting processor that selects one mode from said plurality of modes, said orthogonal transform coefficient data being generated in accordance with said selected mode;

a code-length calculating processor that calculates a code-length corresponding to a bit length of Entropy-encoded bit data obtained by an Entropy coding to said orthogonal transform coefficient data, said code-length calculating processor calculating said code-length in each of said plurality of modes;

an optimum mode determining processor that determines an optimum mode, by which said code-length becomes minimum, from said plurality of modes; and an optimum Entropy coding processor that obtains said Entropy-encoded bit data by applying said Entropy coding to said orthogonal transform coefficient data in accordance with said optimum mode.

2. The compression apparatus according to claim 1, further comprising a recording medium, said reduced-image data, said Entropy-encoded bit data and said optimum mode being recorded in said recording medium.

3. The compression apparatus according to claim 1, wherein each of said first blocks and each of said second blocks are composed of 8×8 (=64) pixels respectively.

4. The compression apparatus according to claim 1, wherein said reduced-image generating processor generates said reduced-image data composed of average pixels, obtained by finding an average value of said plurality of pixels in each of said first blocks.

5. The compression apparatus according to claim 1, wherein said fluency transform processor generates said expanded-image data by applying the fluency transform, which is expressed by the following formula, to each pixel of said reduced-image data $$f(t) = (1/2\pi)\sum_{-\pi}^{\pi} F(u)_{[^{m_o]}}\phi(t,u)du$$

note that, $$_{[^{m_o]}}\phi(t,u) = (1/2\pi)\int_{-\infty}^{\infty}\left\{\sum_{p=-\infty}^{\infty}\delta(\omega - u + 2\pi p)\right\} \times \left\{\sum_{q=-\infty}^{\infty}(1-q(2\pi/\omega))^{-2m}\right\}^{-1/2} \times \exp(i\omega t)d\omega$$

where F(u) corresponds to each pixel value of said reduced-image data, f(t) is output values of the fluency transform, $\phi(t,u)$ is the fluency function defined by a fluency function space $^mS$, and m (=1,2,3, . . . ) is a parameter indicating a differentiability, said parameter m corresponding to said plurality of modes.

6. The compression apparatus according to claim 5, wherein said fluency transform processor applies the fluency transform in a state such that each pixel of said reduced-image data are arranged at a center position of each of said second blocks, and generates said expanded-image data composed of said plurality of pixels by adding said output values f(t) corresponding to pixel positions in said second blocks.

7. The compression apparatus according to claim 6, wherein said plurality of pixels in said original image data is arranged in a matrix, said fluency transform processor applies the fluency transform along a width direction to each pixel of said reduced-image data so that pixels aligned along the width direction are generated, and then applies the fluency transform along a length direction to said pixels aligned along said width direction such that said plurality of pixels in each of said second blocks is generated.

8. The compression apparatus according to claim 1, wherein said optimum mode is determined in each of said second blocks.

9. The compression apparatus according to claim 1, wherein said orthogonal transform processor applies a DCT (Discrete Cosine Transform) processing to said differential value data such that a differential DCT coefficient data is obtained.

10. The compression apparatus according to claim 1, wherein said Entropy coding processor applies a Huffman coding to said orthogonal transform coefficient data so that Huffman-encoded bit data is obtained, said code-length calculating processor calculating said code-length corresponding to said Huffman-encoded bit data, said optimum mode determining processor determining a mode, which makes said code-length minimum, among said plurality of modes as said optimum mode.

11. An expansion apparatus for expanding said reduced-image data recorded in said recording medium by said compression apparatus in claim 2, said expansion apparatus comprising:

a data reading processor that reads said reduced-image data, said Entropy-encoded bit data and said optimum mode recorded in said recording medium;

an optimum mode setting processor that sets said optimum mode among said plurality of modes;

an expanded-image generating processor that applies said fluency transform according to said optimum mode to said reduced-image data such that said expanded-image data is obtained;

an Entropy decoding processor that restores said orthogonal transform coefficient data by applying an Entropy-decoding to said Entropy-encoded bit data;

an inverse orthogonal transform processor that restores said differential value data by applying an inverse orthogonal transform to said orthogonal transform coefficient data;

an original image data restoring processor that restores said original image data on the basis of said expanded-image data and said differential value data.

12. The expansion apparatus according to claim 11, wherein said Entropy-encoded bit data is Huffman-encoded bit data, said Entropy decoding processor applying a Huffman decoding to said Huffman-encoded bit data.

13. The expansion apparatus according to claim 11, wherein said orthogonal transform coefficient data is a differential DCT coefficient data, said inverse orthogonal transform processor applying an inverse DCT processing to said differential DCT coefficient data.

14. A compression method for compressing image data comprising:

transforming original image data partitioned into first blocks, each of which is composed of a plurality of pixels, to reduced-image data composed of a smaller number of pixels than that of said original image data;

applying a fluency transform to said reduced-image data so as to generate expanded-image data partitioned into second blocks corresponding to said first blocks, said fluency transform having a plurality of modes;

obtaining differential value data indicating a difference between said original image data and said expanded-image data;

obtaining orthogonal transform coefficient data by applying an orthogonal transform to said differential value data;

selecting one mode from said plurality of modes, said orthogonal transform coefficient data being generated in accordance with said selected mode;

calculating a code-length corresponding to a bit length of Entropy-encoded bit data obtained by an Entropy coding to said orthogonal transform coefficient data, said code-length being calculated in each of said plurality of modes;

determining an optimum mode, by which said code-length becomes minimum, among said plurality of modes; and obtaining said Entropy-encoded bit data by applying said Entropy coding based on said optimum mode to said orthogonal transform coefficient data.

15. An expansion method for expanding said reduced-image data obtained by said compression method in claim 14, said expansion method comprising:

reading said reduced-image data, said Entropy-encoded bit data and said optimum mode recorded in a recording medium;

setting said optimum mode among said plurality of modes;

applying said fluency transform according to said optimum mode to said reduced-image data such that said expanded-image data is obtained;

restoring said orthogonal transform coefficient data by applying an Entropy-decoding to said Entropy-encoded bit data;

restoring said differential value data by applying an inverse orthogonal transform to said orthogonal transform coefficient data;

restoring said original image data on the basis of said expanded-image data and said differential value data.

16. A memory medium that stores a program for compressing image data, said program comprising:

transforming original image data partitioned into first blocks, each of which is composed of a plurality of pixels, to reduced-image data composed of a smaller number of pixels than that of said original image data;

applying a fluency transform to said reduced-image data so as to generate expanded-image data partitioned into second blocks corresponding to said first blocks, said fluency transform having a plurality of modes;

obtaining differential value data indicating a difference between said original image data and said expanded-image data;

obtaining orthogonal transform coefficient data by applying an orthogonal transform to said differential value data;

selecting one mode from said plurality of modes, said orthogonal transform coefficient data being generated in accordance with said selected mode;

calculating a code-length corresponding to a bit length of an Entropy-encoded bit data obtained by an Entropy coding to said orthogonal transform coefficient data, said code-length being calculated in each of said plurality of modes;

determining an optimum mode, by which said code-length becomes minimum, among said plurality of modes; and obtaining said Entropy-encoded bit data by applying said Entropy coding, based on said optimum mode, to said orthogonal transform coefficient data.

17. A memory medium that stores a program for expanding said reduced-image data obtained by said program for compressing image data in claim 16, said program for expanding comprising:

reading said reduced-image data, said Entropy-encoded bit data and said optimum mode recorded in a recording medium;

setting said optimum mode from said plurality of modes;

applying said fluency transform according to said optimum mode to said reduced-image data such that said expanded-image data is obtained;

restoring said orthogonal transform coefficient data by applying an Entropy-decoding to said Entropy-encoded bit data;

restoring said differential value data by applying an inverse orthogonal transform to said orthogonal transform coefficient data;

restoring said original image data on the basis of said expanded-image data and said differential value data.

* * * * *